(12) United States Patent
Madawala et al.

(10) Patent No.: US 11,322,983 B2
(45) Date of Patent: May 3, 2022

(54) POLYPHASE HYBRID IPT SYSTEM

(71) Applicant: Auckland UniServices Limited, Auckland (NZ)

(72) Inventors: Udaya Kumara Madawala, Stonefields (NZ); Duleepa Jayanath Thrimawithana, Mt Wellington (NZ); Lei Zhao, Parnell (NZ); Patrick Aiguo Hu, Epsom (NZ); Yuan Song, Auckland (NZ)

(73) Assignee: Auckland UniServices Limited, Auckland (NZ)

( * ) Notice: Subject to any disclaimer, the term of this patent is extended or adjusted under 35 U.S.C. 154(b) by 175 days.

(21) Appl. No.: 16/466,994

(22) PCT Filed: Dec. 5, 2017

(86) PCT No.: PCT/NZ2017/050155
§ 371 (c)(1),
(2) Date: Jun. 5, 2019

(87) PCT Pub. No.: WO2018/106124
PCT Pub. Date: Jun. 14, 2018

(65) Prior Publication Data
US 2019/0348866 A1 Nov. 14, 2019

(30) Foreign Application Priority Data
Dec. 5, 2016 (NZ) .......................... 727100

(51) Int. Cl.
*H02J 50/12* (2016.01)
*H01F 38/14* (2006.01)
*H02J 7/02* (2016.01)

(52) U.S. Cl.
CPC .............. *H02J 50/12* (2016.02); *H01F 38/14* (2013.01); *H02J 7/025* (2013.01)

(58) Field of Classification Search
CPC ............ H02J 50/12; H02J 7/025; H01F 38/14
See application file for complete search history.

(56) References Cited

U.S. PATENT DOCUMENTS 9,142,990 B2 * 9/2015 Keeling ................... B60L 53/38
2012/0119698 A1 * 5/2012 Karalis .................. B60L 11/182
320/108

(Continued)

FOREIGN PATENT DOCUMENTS

| WO | WO-2010062198 | 6/2010 |
| WO | WO-2017023180 | 2/2017 |
| WO | WO-2018106124 A1 | 6/2018 |

OTHER PUBLICATIONS

"International Application No. PCT/NZ2017/050155, International Search Report and Written Opinion dated Apr. 12, 2018", (Apr. 12, 2018), 14 pgs.

(Continued)

*Primary Examiner* — Carlos Amaya
(74) *Attorney, Agent, or Firm* — Piloff Passino & Cosenza LLP; Martin J. Cosenza

(57) ABSTRACT

A polyphase inductive power transfer system primary or secondary apparatus includes a magnetic coupling coil associated with each phase and a compensation network associated with each magnetic coupling coil for providing power to or receiving power from the respective coil. At least one of the compensation networks has a different power transfer characteristic to one or more of the other compensation networks.

18 Claims, 4 Drawing Sheets

(56) References Cited

U.S. PATENT DOCUMENTS

2012/0248892 A1* 10/2012 Covic .................... H02J 50/70
  307/104
2015/0015197 A1 1/2015 Mi et al.

OTHER PUBLICATIONS

Zhao, Lei, et al., "A hybrid bi-directional IPT system with improved spatial tolerance", 2015 IEEE 2nd International Future Energy Electronics Conference (IFEEC), Nov. 1-4, 2015 [abstract only], (Nov. 1, 2015), 1-6.
"International Application No. PCT/NZ2017/050155, International Preliminary Report on Patentabilty dated Jun. 20, 2019", 11 pgs.
Tianze Kan et al., "A New Integration Method for an Electric Vehicle Wireless Charging System Using LCC Compensation Topology: Analysis and Design," IEEE Transactions on Power Electronics, Feb. 2017, pp. 1,638-1,650, vol. 32, No. 2.
Junjun Deng et al., "Compact and Efficient Bipolar Coupler for Wireless Power Chargers: Design and Analysis," IEEE Transactions on Power Electronics, Nov. 2015, pp. 6,130-6,140, vol. 30, No. 11.
Yuan Song et al., "Cross Coupling Effects of Poly-phase Bi-directional Inductive Power Transfer Systems used for EV Charging," IEEE Xplore, Nov. 2015.
Weihan Li et al., "Integrated LCC Compensation Topology for Wireless Charger in Electric and Plug-in Electric Vehicles," IEEE Transactions on Industrial Electronics, Jul. 2015, pp. 4,215-4,225, vol. 62, No. 7.

* cited by examiner

POLYPHASE HYBRID IPT SYSTEM

PRIORITY CLAIM TO RELATED APPLICATIONS

This application is a U.S. national stage filing under 35 U.S.C. § 371 from International Application No. PCT/NZ2017/050155, filed on Dec. 5, 2017, and published as WO2018/106124 on 14 Jun. 2018, which claims the benefit under 35 U.S.C. 119 to New Zealand Application No. 727100, filed on Dec. 5, 2016, the benefit of priority of each of which is claimed herein, and which applications and publication are hereby incorporated herein by reference in their entirety.

FIELD OF THE INVENTION

The present invention relates to an inductive power transfer (IPT) system and most particularly to a hybrid IPT system.

BACKGROUND

Depletion of fossil resources has caused numerous environmental, economic and social problems. Renewable resources, green energy and distributed generation (DG) of electricity have become preferred solutions. However, the energy generated from wind, solar, or tides is largely affected by climatic changes. Thus, large energy storage systems are imperative to improve the sustainability and reliability of DG systems. Vehicle-to-Grid (V2G) technology has been proposed and developed as a partial solution, by which full or hybrid electric vehicles (EVs) can be used as a buffer to store energy, or supply power back to a power grid.

Bi-directional Inductive Power Transfer (BD-IPT) is a convenient technique for V2G, where the power can be delivered either from the grid to EVs or from EVs to the grid, across an air gap through weak magnetic coupling without direct electrical contacts. For rapid EV charging and other applications in medium to high power levels, semiconductor devices rated for high voltages and frequencies are essential but such components are relatively expensive and may not be that easy to acquire in the market. Therefore, polyphase topologies are adopted as a way of increasing the power level of IPT systems. However, charging performance of IPT systems is largely governed by the accurate alignment between charging pads or coils, and misalignments cause a significant drop in power transfer and also compromise the system efficiency. Previous research showed that the charging performance of a three-phase LCL BD-IPT system deteriorates with pad-misalignments due to the decrease of the three main coupling coefficients.

OBJECT OF THE INVENTION

It is an object of the invention to provide a hybrid bi-directional IPT system which overcomes or at least ameliorates one or more disadvantages of the prior art, or alternatively to at least provide the public with a useful choice.

SUMMARY OF INVENTION

In one aspect there is provided a polyphase inductive power transfer system primary or secondary apparatus, the apparatus comprising:

- a magnetic coupling coil associated with each phase and a compensation network associated with each magnetic coupling coil for providing power to or receiving power from the respective coil; and
- wherein at least one of the compensation networks has a different power transfer characteristic to one or more of the other compensation networks.

In an embodiment, the at least one compensation network has a first power transfer characteristic and a plurality of other compensation networks have a second power transfer characteristic.

The power transfer characteristics of the first and second compensation networks may be complementary. The compensation network having the first power transfer characteristic may be a capacitor-inductor (CL) compensation network, and the compensation network having the second power transfer characteristic may be an inductor-capacitor-inductor (LCL) compensation network.

The polyphase system may comprise a three phase system.

In another aspect there is provided a power supply apparatus or pick-up for an inductive power transfer system comprising a magnetic flux coupler, the apparatus comprising:

- a magnetic coupling coil associated with each phase and a compensation network associated with each magnetic coupling coil for providing power to or receiving power from the respective coil; and
- wherein at least one of the compensation networks has a different power transfer characteristic to one or more of the other compensation networks.

The use of different power transfer characteristics created by the compensation networks allows the system to have a mixture of impedance characteristics which can be exploited to improve overall performance, for instance under coupler-misalignment. For example if a first compensation network has a negative effect on the power flow, a positive effect can be introduced by the second compensation network.

In an embodiment the power transfer characteristic is used to maintain a required power characteristic.

This allows the IPT apparatus to provide a required (for instance a substantially constant) power characteristics despite changes to the system.

Changes to the system may include, for example, horizontal or vertical distance fluctuations (coupler misalignments) or changes in the apparent impedance or reflected impedance, aging of variation of components.

In an embodiment the magnetic flux coupler is a pad.

In an embodiment the difference in power transfer characteristic is with respect to distance.

In an embodiment the difference in power transfer characteristic is with respect to alignment.

In an embodiment the difference in power transfer characteristic is with respect to the amount power transferred at a range of distances.

In an embodiment the different power transfer characteristic of the first compensation network is complementary to the characteristic of the second compensation network.

In an embodiment a change that causes an increase in the characteristic of the first compensation network substantially results in a decrease in the characteristic of the second compensation network.

In an embodiment the first and second compensation network have different network topologies adapted to cause the difference in power transfer characteristic.

In an embodiment the first and second compensation network differ by at least one circuit component.

In an embodiment the first and second compensation network have a first and second topology respectively.

In an embodiment the at least one circuit component affects the resonant properties of the compensation network.

In an embodiment the first compensation network is a series tuned compensation network and the second compensation network is a parallel tuned compensation network.

In an embodiment the first compensation network is an Inductor-Capacitor-Inductor (LCL) circuit and the second compensation network is a (Capacitor-Inductor) CL circuit.

In an embodiment there is, in use, a relative compensation phase difference or phase modulation between the first and second compensation networks.

In an embodiment there is, in use, a relative coil phase difference or phase modulation between primary and secondary coils.

In an embodiment the relative phase difference is substantially 180 degrees.

In an embodiment a change in the power transfer of the first compensation network is at least in part compensated by a change in the power transfer of the second compensation network.

In an embodiment the power transfer characteristic comprises an impedance or phase angle or angular frequency.

In an embodiment the power transfer characteristic is adapted to provide a spatial tolerance to the power transfer.

The spatial tolerance can be controlled by phase modulation and/or angular frequency and/or relative phase angle between the converters on primary and pick-up sides.

In an embodiment the first and second compensation network are in electrical connection with a single converter.

In an embodiment the first and second compensation network are in electrical connection with a first and second converter respectively.

In an embodiment the first converter and second converter are driven by the same power source.

In an embodiment the first and second compensation network are respectively associated with a single coil. In an embodiment the coil is magnetically associated with the magnetic flux coupler.

In an embodiment the first and second compensation network are respectively associated with first and second coils, the coils magnetically associated with the magnetic flux coupler.

In an embodiment the coils associated with the magnetic coupler are adapted to be substantially mutually decoupled.

In an embodiment the magnetic flux coupler is a Bipolar pad or Double D pad.

In an embodiment the apparatus comprises a plurality of compensation networks for powering at least one coil magnetically associated with the magnetic flux coupler.

In an embodiment the magnetic flux coupler is a 3-phase pad.

In a further aspect the invention may broadly be said to consist in an IPT system comprising a power-supply as in the first aspect and a pick up.

In an embodiment the pick-up is a pick-up as described in the first aspect.

In another aspect there is provided a method of controlling energy flow in a primary or secondary circuit of an IPT system, the method comprising:
  magnetically coupling a coil to another IPT primary of secondary circuit;
  supplying power to a first compensation network having a first power transfer characteristic which varies with coupling; and
  supplying power to a plurality of second compensation networks each having a second power transfer characteristic to compensate for the power transfer characteristic of the first compensation network.

In a further aspect the invention may broadly be said to consist in a method of controlling energy flow in a primary or secondary circuit of an IPT system, the method comprising switching an alternating current to transfer power inductively in a first compensation network, and switching an alternating current to transfer power inductively in a second compensation network wherein the switching of the compensation network has a different power transfer characteristic.

In a further aspect the invention may broadly be said to consist in a method of transmitting power with an IPT system, the IPT system comprising a power source comprising: a first compensation network; and a second compensation network; the method comprising the steps of:
  transmitting power from the power source to an associated pick-up; and
  wherein respective power transfer characteristics of the first and second compensation networks adapt to maintain a required power transfer.

In an embodiment the method comprises the step of allowing the mutual coupling between the power source and the pick up to change.

In an embodiment the first and second compensation networks are associated with at least one converter.

In an embodiment the first and second compensation network are associated with first and second compensation networks respectively.

In an embodiment the required power transfer is substantially constant.

In an embodiment the mutual coupling is changed by changing the horizontal and/or vertical distance between the power source and pick-up.

In an embodiment the compensation networks have different topologies that adapt in to the change in mutual coupling complementarily.

In a further aspect the invention may broadly be said to consist in a method of receiving power with an IPT system, the IPT system comprising a pick-up comprising: a first converter associated with a first compensation network; and a second converter associated with a second compensation network; the method comprising the steps of:
  receiving power from the pick-up from an associated power source; and
  wherein respective power transfer characteristics of the first and second compensation networks adapt to maintain a required power transfer.

In an embodiment the method comprises the step of allowing the mutual coupling between the power source and the pick up to change.

In an embodiment the required power transfer is substantially constant.

In a further aspect the invention may be broadly said to consist in a power supply apparatus or pick-up for an inductive power transfer system comprising a magnetic flux coupler, the apparatus comprising: a first and second compensation network circuit for powering at least one coil magnetically associated with the magnetic flux coupler; and wherein the first and second resonant circuit have different topologies.

In a further aspect the invention may be said to consist in a hybrid bi-directional IPT system using or adapted to be used for any one or more of the methods described herein.

In another aspect the invention provides a polyphase wireless power transfer circuit comprising: a first and second compensation network circuit configured to provide power to co-planar magnetic flux coupling coils; and wherein the first and second compensation networks have different topologies.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

DRAWING DESCRIPTION

A number of embodiments of the invention will now be described by way of example with reference to the drawings as follows.

Figure 7:
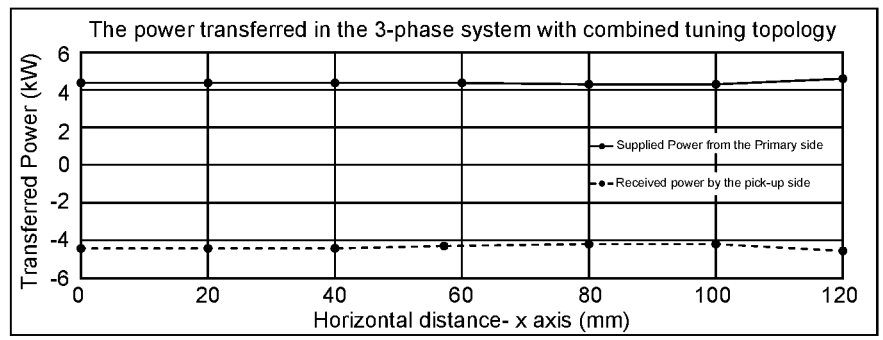
Figure 7:
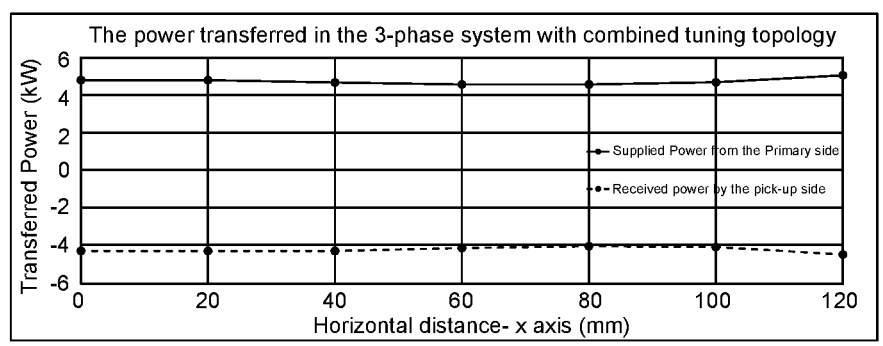
Figure 8:
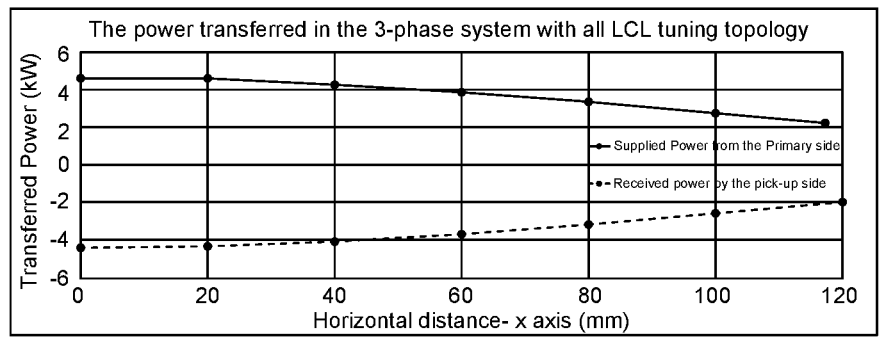
Figure 8:
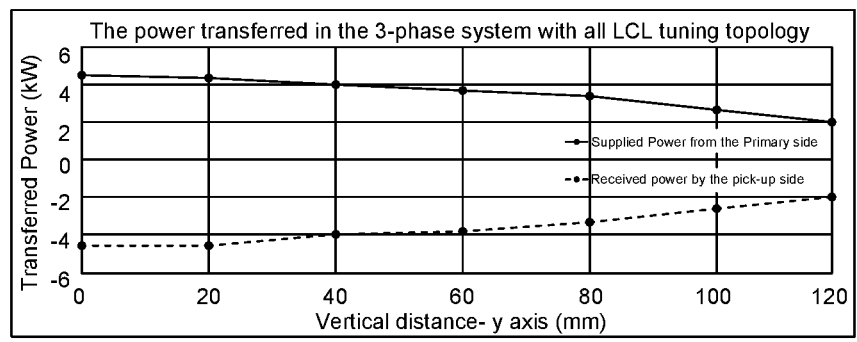

FIG. 7(a) and FIG. 8 (a) show the transferred power with two systems when the pick-up pad was moved horizontally (along the x-axis).

FIG. 7(b) and FIG. 8 (b) show the power change in the two systems when the pick-up pad was moved vertically (along the y-axis).

DETAILED DESCRIPTION OF THE DRAWINGS

Performance of inductively coupled electric vehicle (EV) charging systems is significantly affected by the misalignments between magnetic coupling structures. Such structures are often referred to as pads, or charging pads, and typically include one or more coils of electrically conductive material which may be associated with a magnetically permeable material such as ferrite.

We have investigated the use of inductor-capacitor-inductor (LCL) and capacitor-inductor (CL) compensations in wireless charging systems, based on inductive power transfer (IPT), to achieve high tolerance towards pad-misalignments. A polyphase system in the form of a three phase bi-directional inductive power transfer (BD-IPT) system is studied with both LCL and CL compensations, and a mathematical model is developed to investigate its performance under pad-misalignments. Theoretical results are presented in comparison with simulations, verifying the proposed concept and the accuracy of the developed model. Both theoretical and simulation results indicate that the adoption of combined compensations is a promising approach to achieve high tolerance for pad-misalignments during wireless charging.

We propose a three-phase BD-IPT system with combined LCL and CL compensations at different phases to increase the overall coupling tolerance with improved power transfer performance under large pad-misalignments in poly-phase IPT charging systems. A mathematical model is developed to investigate the wireless charging behaviour under different charging alignments. Theoretical charging performance of the proposed system is compared with Simulink/PLECS simulation results. The results are presented to validate the proposed model, as well as to demonstrate that the combined compensation can be used to achieve high tolerance of pad-misalignments. It will be apparent to those skilled in the art that compensation networks, and combinations of compensation networks, other than those specifically disclosed herein may be used to implement a required overall power transfer characteristic for a polyphase IPT system according to the teachings of this disclosure.

II. Proposed System and Analysis

A. A Three-Phase BD-IPT System with Combined LCL and LC Compensations

Figure 1:
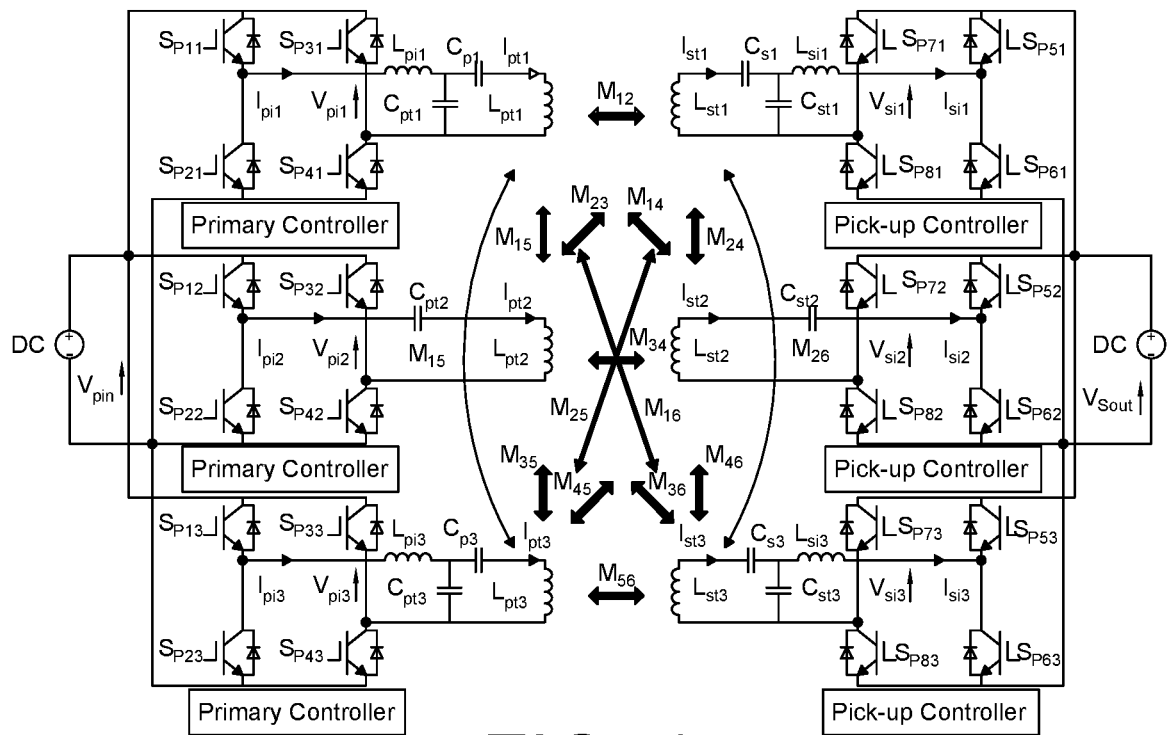
FIG. 1 shows the proposed system with symmetrical configurations at the primary and pick-up sides, with LCL compensation at the first and third phases and CL compensation at the second phase.

FIG. 1 shows the proposed system with symmetrical configurations at the primary and pick-up sides, with an LCL compensation network at the first and third phases and a CL compensation network at the second phase. Although the primary and secondary are symmetric relative to each other, each is asymmetric in respect of the arrangement of compensation networks in this example. The amount and the direction of the power flow can be controlled by regulating the amplitude of and the relative phase angle between the voltages produced by converters, as is known in the art. When the power is transferred forward (from the primary side to pick-up side), the converters in the primary side and pick-up side are operated as an inverter and a rectifier, respectively. Similarly, when power is extracted from the pick-up side, the converter in the primary side becomes a controlled rectifier and the pick-up side operates as an inverter.

The LCL and CL resonant networks of both the primary and pick-up sides are driven by the voltages produced by two converters. Coil inductances $L_{pt1}$, $L_{pt2}$ and $L_{pt3}$ on the primary side are magnetically coupled to coil inductances $L_{st1}$, $L_{st2}$ and $L_{st3}$ on the pick-up side. All LCL and CL networks are tuned to the system operating frequency $f_r$. The three converters on each side are operated with a 50% duty cycle at the resonant frequency but with a 120-degree phase shift to each other.

Mathematical Model of the Proposed System

Figure 2:
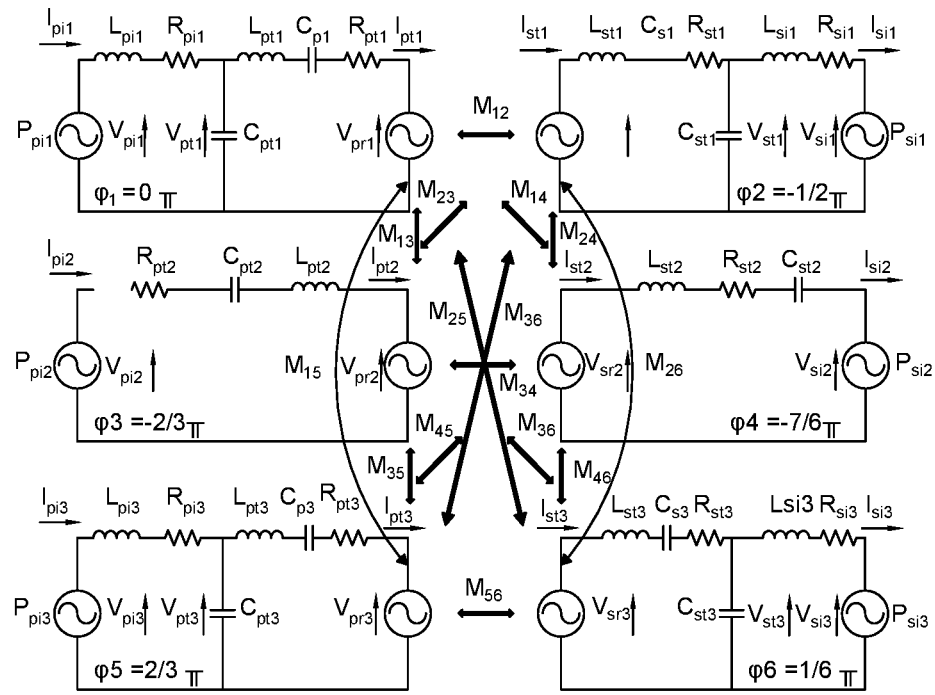
FIG. 2 shows a simplified equivalent circuit to that of FIG. 1.

The proposed system can be analyzed in the phase domain using the simplified equivalent circuit shown in FIG. 2. The input voltages $V_{pi,k}$ and $V_{si,k}$, produced by the two converters on the primary and pick-up sides, can be given by Fourier series, $$V_{pi,k} = V_{pin} \frac{4}{\pi} \sum_{n=1,3...}^{\infty} \frac{1}{n} \cos(n\omega_T t + n\phi_{i,k}) \sin\left(\frac{n}{2}\theta_{i,k}\right) \quad (1)$$

$$V_{si,k} = V_{sout} \frac{4}{\pi} \sum_{n=1,3...}^{\infty} \frac{1}{n} \cos(n\omega_T t + n\phi_{j,k}) \sin\left(\frac{n}{2}\theta_{j,k}\right) \quad (2)$$

where $\omega_T$ is the angular frequency, given by $2\pi f_T$, and $V_{pin}$ and $V_{sout}$ are input and output DC voltages, and $\phi$ and $\theta$ are the phase angle and the phase shift on the primary and pick-up sides of the three phases, respectively.

The LCL and CL networks are all tuned to the resonant frequency $f_T$ and therefore, $$\omega_T^2 = (2\pi f_T)^2 = \frac{1}{L_{pi1}C_{pt1}} = \frac{1}{L_{pt1}C_{pt1}} = \frac{1}{L_{st1}C_{st1}} = \frac{1}{L_{pt2}C_{pt2}} = \ldots = \frac{1}{L_{si3}C_{st3}} \quad (3)$$

The induced voltages due to the mutual inductance can be given as a matrix.

$$\begin{bmatrix} V_{pr1} \\ V_{sr1} \\ V_{pr2} \\ V_{sr2} \\ V_{pr3} \\ V_{sr3} \end{bmatrix} = j\omega \begin{bmatrix} 0 & -M_{12} & M_{13} & -M_{14} & M_{15} & -M_{16} \\ M_{21} & 0 & M_{23} & -M_{24} & M_{25} & -M_{26} \\ M_{31} & -M_{32} & 0 & -M_{34} & M_{35} & -M_{36} \\ M_{41} & -M_{42} & M_{43} & 0 & M_{45} & -M_{46} \\ M_{51} & -M_{52} & M_{53} & -M_{54} & 0 & -M_{56} \\ M_{61} & -M_{62} & M_{63} & -M_{64} & M_{65} & 0 \end{bmatrix} \begin{bmatrix} I_{pt1} \\ I_{st1} \\ I_{pt2} \\ I_{st2} \\ I_{pt3} \\ I_{st3} \end{bmatrix} \quad (4)$$

where $\omega=n\omega_T$, $M_{12}=M_{21}$, $M_{13}=M_{31}$, ..., $M_{56}=M_{65}$. The 'n' is the order of harmonics, and M is the mutual inductance between coils. Subscripts 1-6 stand for the primary and pick-up sides in the first, second and third phase, respectively.

By further simplifying (4), the induced voltages in coils on both primary and pick-up sides can be derived as, $$X = (E + M_C Z)^{-1} \times M_C \times V \quad (5)$$

where $X = [V_{pr1}, V_{sr1}, V_{pr2}, V_{sr2}, V_{pr3}, V_{sr3}]^T$ $V = [V_{pi1}, V_{si1}, V_{pi2}, V_{si2}, V_{pi3}, V_{si3}]^T$ $$Z = \begin{bmatrix} 1+j\omega C_{pt1}Z_{pi1} & 0 & 0 & 0 & 0 & 0 \\ 0 & 1+j\omega C_{st1}Z_{si1} & 0 & 0 & 0 & 0 \\ 0 & 0 & 1 & 0 & 0 & 0 \\ 0 & 0 & 0 & 1 & 0 & 0 \\ 0 & 0 & 0 & 0 & 1+j\omega C_{pt3}Z_{pi3} & 0 \\ 0 & 0 & 0 & 0 & 0 & 1+j\omega C_{st3}Z_{si3} \end{bmatrix}$$

$$M_C = \begin{bmatrix} 0 & \frac{\omega^2 M_{12}C_{st1}}{1-b} & \frac{j\omega M_{13}}{Z_{p2}} & \frac{j\omega M_{14}}{Z_{s2}} & \frac{\omega^2 M_{15}C_{pt3}}{1-e} & \frac{\omega^2 M_{16}C_{st3}}{1-f} \\ \frac{\omega^2 M_{21}C_{pt1}}{1-a} & 0 & \frac{j\omega M_{23}}{Z_{p2}} & \frac{j\omega M_{24}}{Z_{s2}} & \frac{\omega^2 M_{25}C_{pt3}}{1-e} & \frac{\omega^2 M_{26}C_{st3}}{1-f} \\ \frac{\omega^2 M_{31}C_{pt1}}{1-a} & \frac{\omega^2 M_{32}C_{st1}}{1-b} & 0 & \frac{j\omega M_{34}}{Z_{s2}} & \frac{\omega^2 M_{35}C_{pt3}}{1-e} & \frac{\omega^2 M_{36}C_{st3}}{1-f} \\ \frac{\omega^2 M_{41}C_{pt1}}{1-a} & \frac{\omega^2 M_{42}C_{st1}}{1-b} & \frac{j\omega M_{43}}{Z_{p2}} & 0 & \frac{\omega^2 M_{45}C_{pt3}}{1-e} & \frac{\omega^2 M_{46}C_{st3}}{1-f} \\ \frac{\omega^2 M_{51}C_{pt1}}{1-a} & \frac{\omega^2 M_{52}C_{st1}}{1-b} & \frac{j\omega M_{53}}{Z_{p2}} & \frac{j\omega M_{54}}{Z_{s2}} & 0 & \frac{\omega^2 M_{56}C_{st3}}{1-f} \\ \frac{\omega^2 M_{61}C_{pt1}}{1-a} & \frac{\omega^2 M_{62}C_{st1}}{1-b} & \frac{j\omega M_{63}}{Z_{p2}} & \frac{j\omega M_{64}}{Z_{s2}} & \frac{\omega^2 M_{65}C_{pt3}}{1-e} & 0 \end{bmatrix}$$

$Z_{pi,k} = j\omega L_{pii,k} + 1/j\omega C_{pi,k} + R_{pi,k}$ $Z_{pt,k} = j\omega L_{pt,k} + R_{pt,k}$ $Z_{si,k} = j\omega L_{sii,k} + 1/j\omega C_{si,k} + R_{si,k}$ $Z_{st,k} = j\omega L_{st,k} + R_{st,k}$ $Z_{p2} = j\omega L_{pt2} + 1/j\omega C_{pt2} + R_{pt2}$ $Z_{s2} = j\omega L_{st2} + 1/j\omega C_{st2} + R_{st2}$ $a = (1 + j\omega C_{pt1}Z_{pi1})(1 + j\omega C_{pt1}Z_{pt1})$ $b = (1 + j\omega C_{st1}Z_{si1})(1 + j\omega C_{st1}Z_{st1})$ $e = (1 + j\omega C_{pt3}Z_{pi3})(1 + j\omega C_{pt3}Z_{pt3})$ $f = (1 + j\omega C_{st3}Z_{si3})(1 + j\omega C_{st3}Z_{st3})$ The above (1)-(5), mathematically represent the proposed system in FIG. 1 and can be used to investigate its performance.

Charging Pad Configuration

Figure 3:
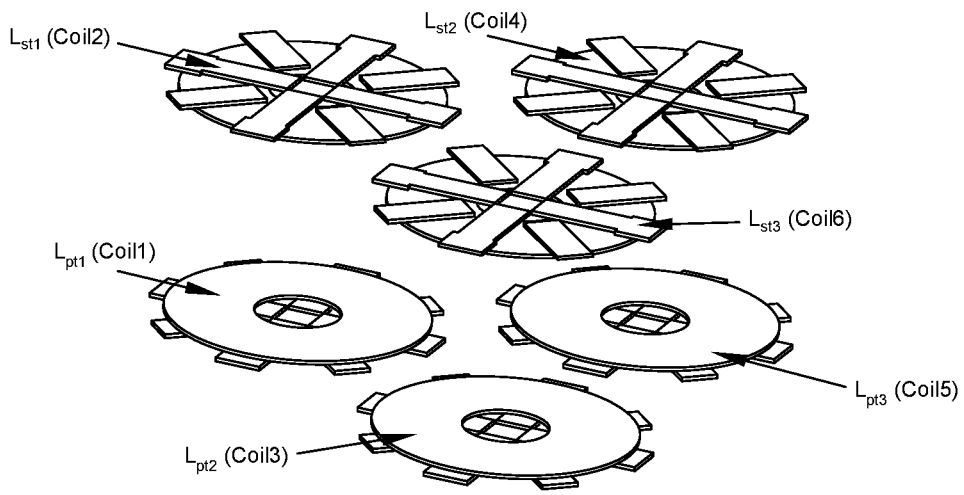
FIG. 3 shows a primary and secondary (i.e. pick-up) charging pad configuration that may be used in the proposed system of FIG. 1.

In order to get accurate simulation results, the charging pads, configured as shown in FIG. 3, are designed in SOLIDWORKS. The lower three structures that comprise coils 1, 3 and 5 comprise the primary pad or pads. The upper three structures comprising coils 2, 4 and 6 comprise the secondary or pick-up pad or pads. The values of the coils inductance are simulated in JMAG. The coupling coefficients can be calculated based on the results and they are given in TABLE I.

TABLE I

PARAMETERS OF THE PADS

| Material of coils | Copper |
|---|---|
| Core material | Mn—Zn 2500 |
| Thickness of coils | 6 mm |
| Turns of the coils | 20 |
| Inductance of coils | 136 µH |
| Frequency | 85 kHz |
| Main coupling coefficients ($k_{12}$, $k_{34}$, $k_{56}$) | 0.28 |
| Side coupling coefficients $k_{13}$, $k_{15}$, $k_{35}$ $k_{24}$, $k_{26}$, $k_{46}$ | 0.008 |
| Cross coupling coefficients $k_{14}$, $k_{16}$, $k_{23}$ $k_{25}$, $k_{36}$, $k_{45}$ | 0.0072 |

Verification of the Mathematical Model

Figure 4:
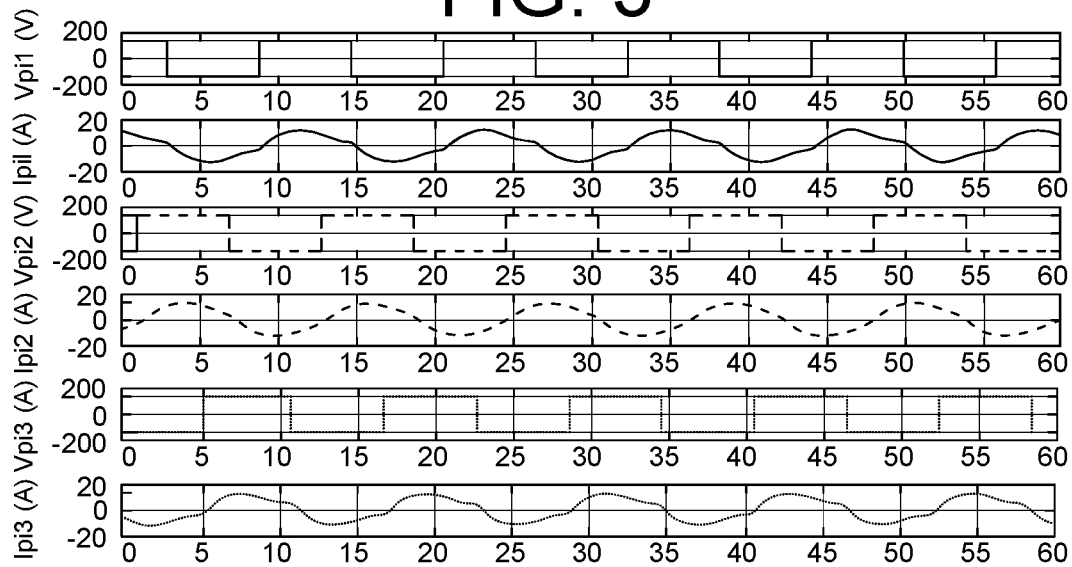
FIGS. 4 and 5 show the results from the mathematical model and the simulation of the proposed system of FIG. 1.
Figure 4:
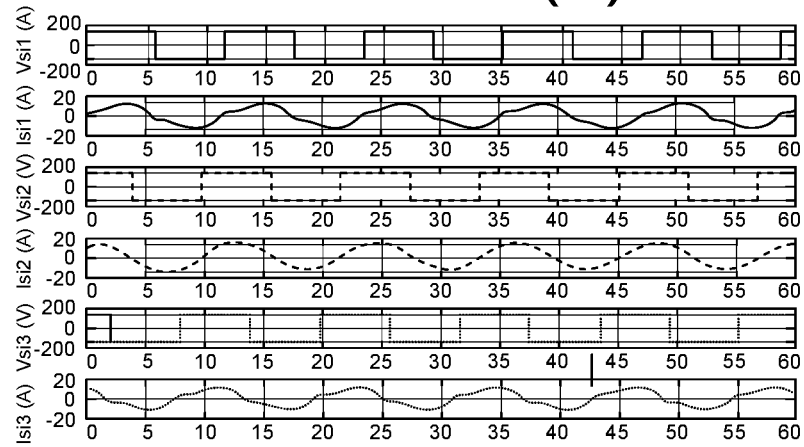
Figure 5:
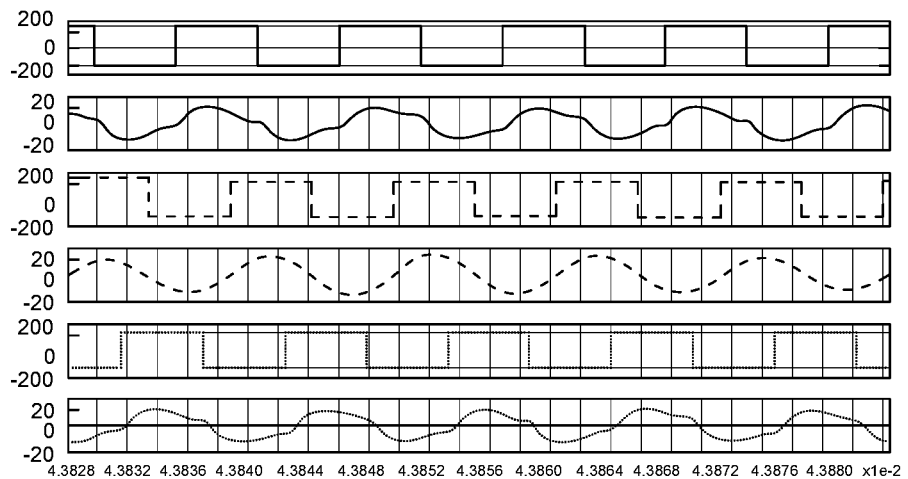
Figure 5:
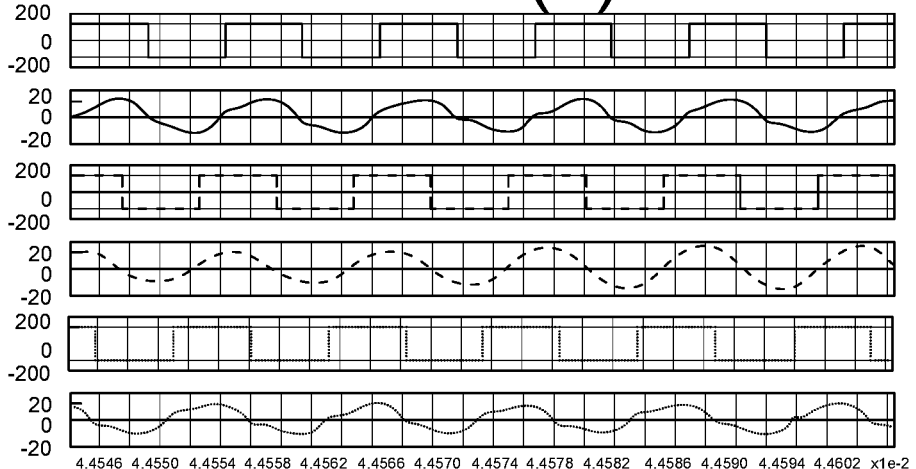

In order to verify the developed mathematical model of the proposed system, a 4.5 kW three-phase BD-IPT system with combined LCL and CL networks was modeled and simulated in MATLAB and SIMULINK/PLECS. The system parameters are listed in TABLE II. The results from the mathematical model and the simulation are shown in FIG. 4 and FIG. 5, respectively.

The system is running under the condition that the power is delivered from the primary side to the pick-up side. The three converters on each side are operating at the resonant frequency 85 kHz with a 120-degree phase shift to each other.

TABLE II

PARAMETERS OF THE 4.5 kW 3-PHASE BD-IPT SYSTEM

| Input voltages | 200 V |
|---|---|
| Frequency fr | 85 kHz |
| Coils inductance | 136 µH |
| Tuning capacitors | $C_{pt1} = C_{st1} = C_{pt3} = C_{st3} = 0.087 \mu F$ |
| | $C_{pt2} = C_{st2} = 0.025 \mu F$ |
| | $C_{p1} = C_{s1} = C_{p3} = C_{s3} = 0.036 \mu F$ |
| ESR | 0.1 Ω |

FIG. 4 (a) and FIG. 4 (b) show the theoretical results of the input voltages and currents ($V_{Pi}$, $I_{pi}$, $V_{si}$ and $I_{si}$) on both sides of three phases. A three-phase system with the same parameters is simulated in SIMULINK/PLECS as well. The results of the input voltages and currents are shown in FIG. 5 (a) and FIG. 5 (b) separately.

As shown in FIG. 4 and FIG. 5, the power is transferred from the primary side to the pick-up side as the phase angle difference between the input voltage $V_{pi}$ and $V_{si}$ is 90 degrees in each phase. Each leg of the reversible inverters is operated with a 50% duty cycle and with a phase shift such that $V_{pi2}$ lags $V_{pi1}$ by 120 degrees and $V_{pi3}$ leads $V_{pi1}$ by 120 degrees. The inverters on both sides are running at a 180-degree phase shift modulation to achieve maximum power transfer.

It can be seen that there is good agreement between the mathematical model and the simulation results. This confirms the validity and accuracy of the proposed three-phase BD-IPT system with combined tuning topology mathematical model. Compared with the results from [18], in which the LCL tuning topology is used in all three phases, there is less distortion in the input currents ($I_{pi1}$ $I_{si1}$, $I_{pi3}$ and $I_{si3}$). The waveforms are closer to a sinusoid with little distortion and harmonics.

The mathematical model can be used to describe the system characteristics. Further investigation on power change caused by pad-misalignments can be conducted by using the developed mathematical model.

Performance Analysis of the Proposed System

Figure 6:
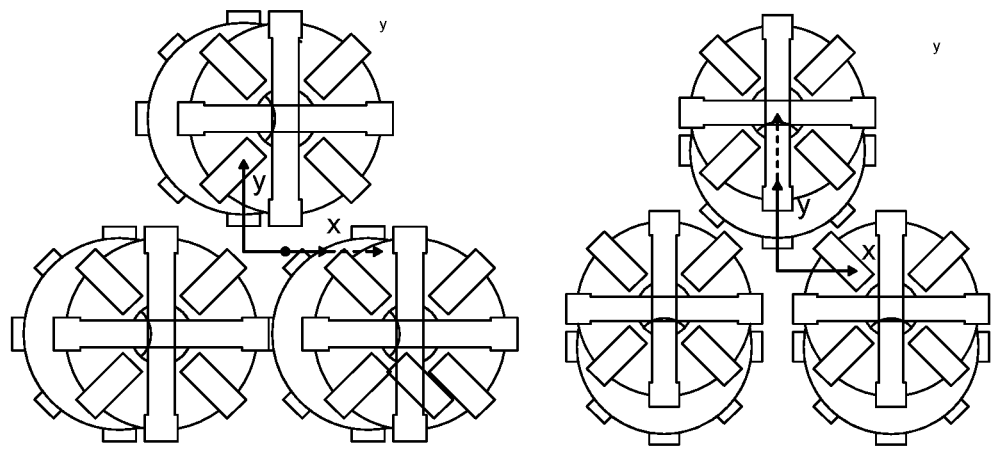
FIG. 6 illustrates the relative movement of the pad construction of FIG. 3 that was modelled in SOLIDWORKS and simulated in JMAG.

The pads movement is modelled in SOLIDWORKS and simulated in JMAG as shown in FIG. 6. The pick-up pad is moved along the horizontal direction (x-axis) and the vertical direction (y-axis) from 0 mm to 120 mm, respectively. The distance between two pads (z-axis) is kept at 140 mm. As can be seen from the drawings, the coils in the pad structures are flat, and are substantially co-planar. They may be magnetically coupled, or decoupled. Thus, DD or bipolar coil/pad structures may be used. In DD arrangements, the coils are coupled and provided adjacent to each other. In bipolar arrangements, the coils partially overlap each other in order to provide at least partial decoupling.

As the pick-up pad and the primary pad are misaligned, both the self-inductance and the mutual inductances between two pads change. These changes are calculated in JMAG and then applied in the following simulation. By applying the calculated values of the self-inductance and coupling coefficients when the pick-up pad aligns in different positions with respect to the primary pad, power transferred in two systems (the proposed one with combined tuning topology and the one with LCL tuning topology) can be simulated and plotted as shown in FIG. 7 and FIG. 8.

FIG. 7 (a) and FIG. 8 (a) show the transferred power with two systems when the pick-up pad was moved horizontally (along the x-axis) while FIG. 7 (b) and FIG. 8 (b) indicate the power change in the two systems when the pick-up pad was moved vertically (along the y-axis). The solid lines in both figures are the supplied power from the primary side; the dashed lines indicate the received power by the pick-up side. It is evident from these two figures that the proposed system with combined tuning topology can maintain the output power of around 4.5 kW regardless of the position of the two charging pads (in the range of 120 mm). The system with LCL tuning topology, on the other hand, has a significant drop in output power from 4.5 kW to 2.1 kW when the magnetic coils were misaligned by 120 mm in the x- or y-axis. This demonstrates that the drop in power due to pad-misalignments can be compensated for by the proposed combined tuning topology.

An LCL and CL combined compensation topology for poly-phase IPT systems has been proposed to overcome the drop in power due to pad misalignments during EV charging. Results of a three phase BD-IPT system with combined compensations have been presented, together with a mathematical model, to demonstrate the applicability of the proposed concept. Simulations results have also been presented under pad-misalignments to verify the accuracy of the mathematical model. Results indicate that the proposed concept can be employed to overcome the drop in power due to pad-misalignments.

Throughout the description like reference numerals are used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

The invention claimed is:

1. A polyphase inductive power transfer system primary or secondary apparatus, the apparatus comprising:
a magnetic coupling coil associated with each phase and a compensation network associated with each magnetic coupling coil for providing power to or receiving power from the respective coil,
wherein at least one of the compensation networks has a different power transfer characteristic to one or more of the other compensation networks, and
wherein the at least one compensation network has a first power transfer characteristic and a plurality of other compensation networks have a second power transfer characteristic that are the same.

2. The apparatus as claimed in claim 1, wherein the power transfer characteristics of the first and second compensation networks is complementary.

3. The apparatus as claimed in claim 1 wherein the magnetic coupling coils are magnetically and/or electrically coupled.

4. The apparatus as claimed in claim 1 wherein the magnetic coupling coils are substantially co-planar.

5. The apparatus as claimed in claim 1 wherein the magnetic coupling coils partially overlap each other.

6. A power supply apparatus or pick-up for an inductive power transfer system comprising a magnetic flux coupler, the apparatus comprising:
a magnetic coupling coil associated with each phase and a compensation network associated with each magnetic coupling coil for providing power to or receiving power from the respective coil,
wherein at least one of the compensation networks has a different power transfer characteristic to one or more of the other compensation networks,
wherein the power supply apparatus is configured to provide a relative compensation phase difference or phase modulation between the first and second compensation networks and/or to provide a relative coil phase difference or phase modulation between the coupling coil and another coil, and
wherein the apparatus has at least three phases.

7. The power supply as claimed in claim 6, wherein the compensation networks have different network topologies.

8. The power supply as claimed in claim 6, wherein one compensation network is a series compensation network and another compensation network is a parallel compensation network.

9. The power supply as claimed in claim 6, wherein the different power transfer characteristic of the at least one of the compensation networks is complementary to the characteristic of the one or more other compensation networks.

10. A method of controlling energy flow in a primary or secondary circuit of an IPT system, the method comprising:
magnetically coupling a coil to another IPT primary of secondary circuit;
supplying power to a first compensation network having a first power transfer characteristic which varies with coupling; and
supplying power to a plurality of second compensation networks each having a second power transfer characteristic to compensate for the power transfer characteristic of the first compensation network, wherein coils attached to the first and second compensation networks are mutually coupled.

11. The method as claimed in claim 10 further comprising allowing the mutual coupling between the power source and the pick up to change.

12. The method as claimed in claim 10 further comprising maintaining the power transfer substantially constant.

13. A polyphase wireless power transfer circuit having at least three phases comprising:
a first compensation network circuit and a plurality of second compensation network circuits providing power to co-planar magnetic flux coupling coils,
wherein the first compensation network circuit has a different topology from at least two of the plurality of second compensation network circuits, and
wherein the coils are magnetically coupled.

14. The apparatus as claimed in claim 1, wherein the plurality of other compensation networks is at least four.

15. The apparatus as claimed in claim 1, wherein there are only two compensation networks that have the second power transfer characteristic.

16. The power supply as claimed in claim 6, wherein the power supply apparatus is configured to provide the relative compensation phase difference or phase modulation between the first and second compensation networks.

17. The power supply as claimed in claim 6, wherein the power supply apparatus is configured to provide the relative coil phase difference or phase modulation between the coupling coil and another coil.

18. The apparatus as claimed in claim 1, wherein there are at least three magnetic coupling coils and phases and compensation networks associated with each magnetic coupling coil for providing power to respective coil, wherein the at least three magnetic coupling coils are mutually coupled.

* * * * *